Jan. 21, 1936.     G. I. GOODWIN     2,028,389
CLUTCH
Filed Feb. 27, 1931     3 Sheets-Sheet 1
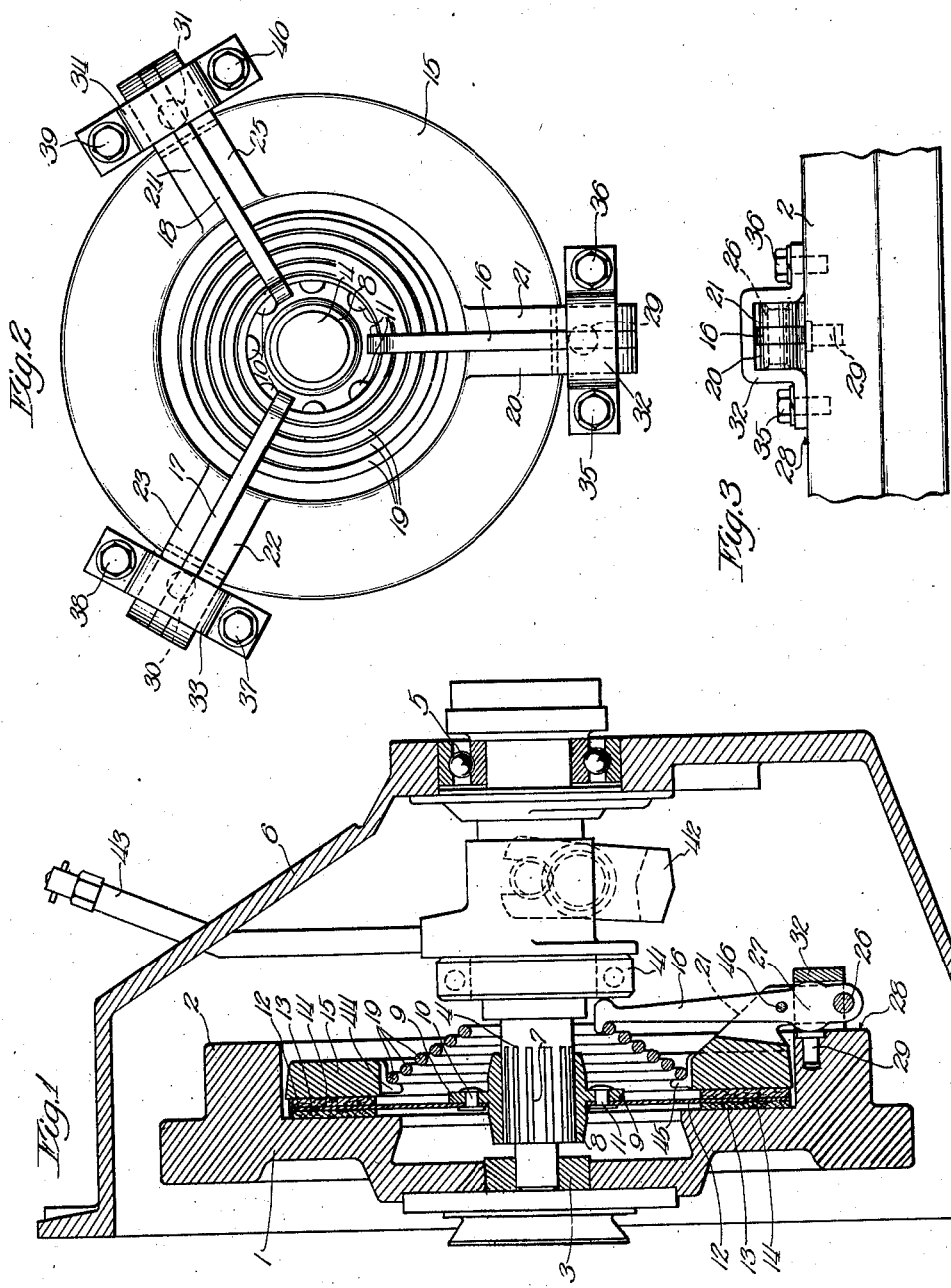
Inventor:
George I. Goodwin Jan. 21, 1936.  G. I. GOODWIN  2,028,389
CLUTCH
Filed Feb. 27, 1931   3 Sheets-Sheet 2
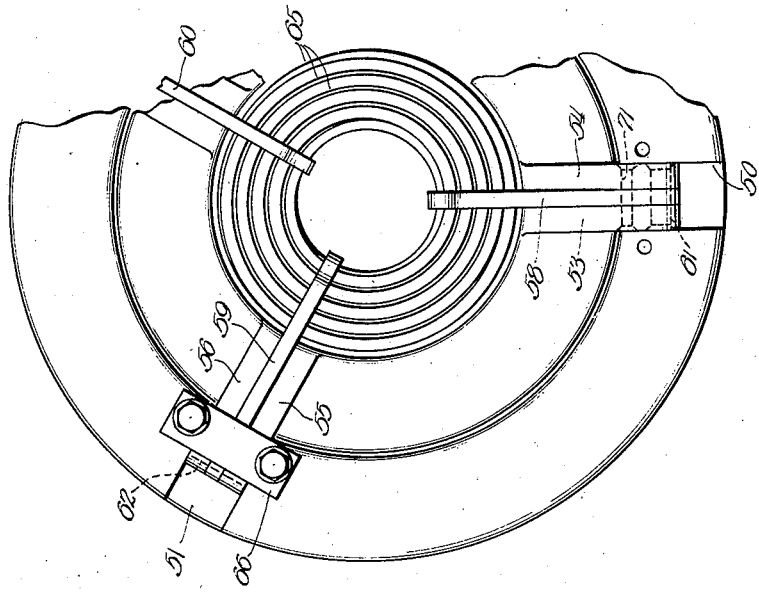
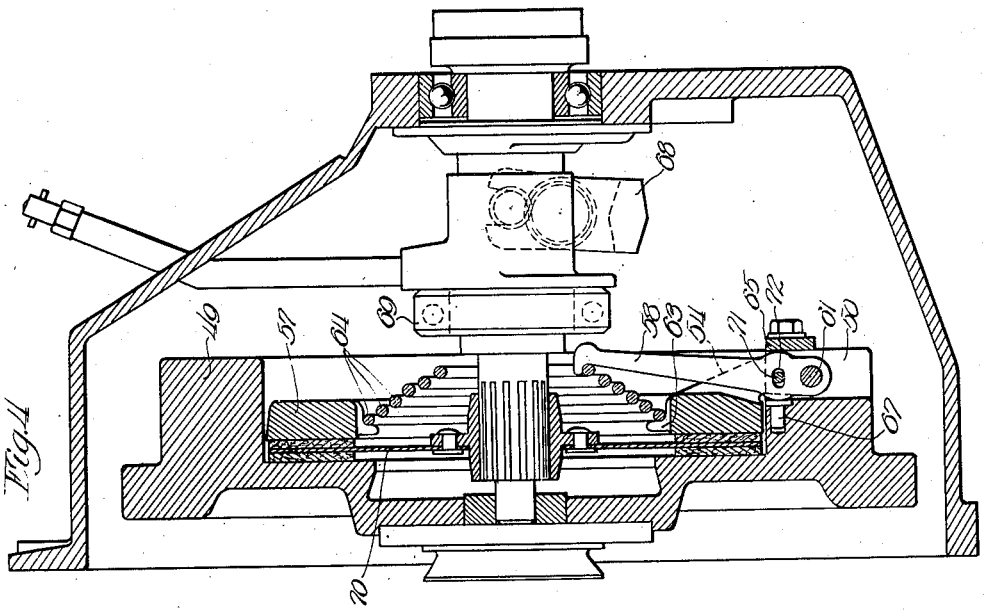
Inventor.
George I. Goodwin
By Brown Jackson Boettcher Dienner
attys.

Jan. 21, 1936.  G. I. GOODWIN  2,028,389
CLUTCH
Filed Feb. 27, 1931  3 Sheets-Sheet 3
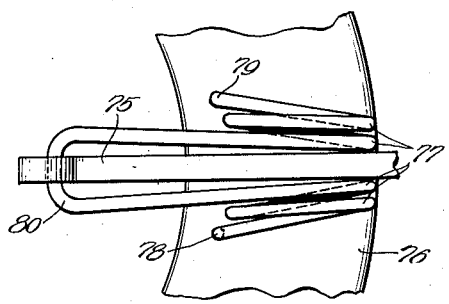
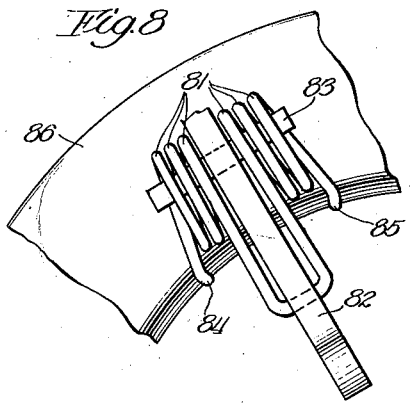
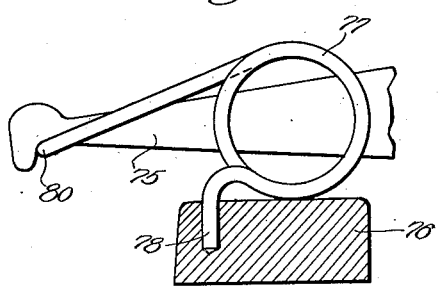
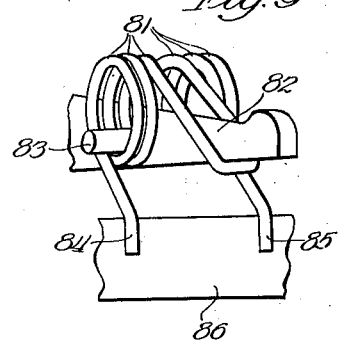
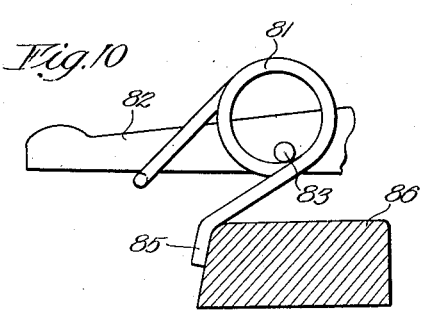
Inventor:
George I. Goodwin
Atty.

Patented Jan. 21, 1936

2,028,389

UNITED STATES PATENT OFFICE 2,028,389

CLUTCH

George I. Goodwin, Detroit, Mich.

Application February 27, 1931, Serial No. 518,634

17 Claims. (Cl. 192—68)

My invention relates to clutches, particularly to clutches for automobiles, and the primary aim and object of my invention resides in the provision of simplified clutch mechanisms in which I have incorporated numerous improvements and novel features.

A clutch mechanism of the character as I have disclosed in the present case may be broadly defined by stating that the same is a mechanism for optionally coupling a driving member in driving engagement with a driven member. In case of an automobile, the clutch mechanism is disposed between the driving member of the engine (which may be the fly-wheel carried by the crank shaft) and a driven shaft.

The clutch comprises, generally speaking, a driven member which is in relatively loose coupling with the driven shaft. This driven member may be brought into frictional or other engagement with the fly-wheel in order to transmit the driving force from the fly-wheel to the driven shaft. The mechanism for accomplishing this result includes a force peculiar thereto for maintaining the aforementioned driven member in driving relation with the fly-wheel. Means are provided for operating this mechanism whenever disengagement of the clutch is desired, and when this means is actuated, the mechanism will be operated against the force of the means which maintains the clutch in engagement, and the driven member which is in loose coupling with the driven shaft and in frictional or other engagement with the fly-wheel will disengage the latter.

In the constructions disclosed in the present case, I have provided a driven member which may be a plate or disc of the flexible type, mounted on a hub member which is endwise movable on a splined portion of the driven shaft. Mounted on either side of the outer portion of this driven plate are friction members. This driven plate is disposed next to the flywheel, and the friction member or members on one side thereof may engage a friction surface on the fly-wheel when the clutch is in engagement. When this is the case, the driving force will be transmitted directly from the fly-wheel to the driven disc or plate and from there to the driven shaft by means of the hub which engages the splined section on the driven shaft.

Disposed on the other side of the driven plate is the clutch operating mechanism. It comprises a pressure plate adapted to engage the friction member or members on the driven plate, a plurality of levers pivotally connected with the pressure plate, spring means disposed between the pressure plate and the levers and reacting against the same, and abutment means for providing reaction bases for the various levers in their operating movements. Due to the action of the spring means, the levers will tend to move away from the pressure plate, and this tendency of the levers will be opposed by the reaction bases on the abutment means against which the levers react in the clutch engaging motion. These abutment members are mounted on the fly-wheel. Therefore, the action of the spring means of the clutch will result in depressing the pressure plate against the friction member on the outer portion of the driven plate, and this plate will be pressed against the friction surface on the fly-wheel. Driving relation between the fly-wheel and the driven shaft is thus secured. The clutch is in engagement.

A thrust bearing is provided on a sleeve which surrounds the driven shaft. This thrust bearing, or throwout bearings, as it is sometimes called, may be of the carbon, graphite, or of the wood block type, or of any other suitable type. It may be actuated through a bracket lever system when disengagement of the clutch is desired, and when this is the case, the thrust bearing will move, will engage the levers and depress the same against the force of the spring means to disengage the clutch.

During this disengaging operation, the levers may react either directly against the fly-wheel or against certain abutment members mounted on the fly-wheel, and the moving of the levers, by the thrust bearing, against the force of the spring means, will result in lifting the pressure plate out of engagement with the driven plate. The latter will, therefore, disengage the friction surface of the fly-wheel. The transmission of driving force will be discontinued. The clutch is disengaged.

Numerous structural and functional points must be considered in connection with such a clutch. I have enumerated below some of the salient points which are of importance, either from the production point of view, or from the operating standpoint, so that the more detailed discussion of my invention which is yet to follow may be easily understood and appreciated.

Each part must be designed so as to be easily fabricated, easily assembled in cooperation with other parts, and so constructed that the clutch renders reliable service.

The purpose of the spring means is to hold the clutch in firm and reliable engagement. This requires considerable force. On the other hand, it is undesirable to employ unduly heavy springs for accomplishing the desired result. I have therefore provided a lever system whereby the force of the spring means is multiplied for clutch engagement, and yet so that disengagement can easily be accomplished.

Another consideration to which I wish to call attention at this point is the problem of heat production due to slippage. Some means must be provided for conducting excessive heat away from the clutch mechanism in order to cool the same.

There are, generally speaking, two ways in which this can be accomplished.

In accordance with one general scheme, special clutch cooling means may be provided for forcing a draft through the clutch. This means may take the form of fins or blades attached to certain moving parts, or louver means suitably disposed, for catching the air and for forcing the same through the clutch mechanism.

The other general scheme proposes to dispense with special cooling provisions and proceeds on the theory that the clutch should be designed so as to radiate heat efficiently.

I have designed my clutch structures, and every part therein, in accordance with the latter general scheme. The clutches shown in this application are open clutches, and the parts are designed so as to limit the production of heat, to prevent transfer of heat from one part to the other, and to promote the radiation of heat to the outside. It is, of course, understood that special draft means as intimated above may be provided if desired.

These three general points: namely, the design of all parts in accordance with principles of efficient production, assembly and operation; the problem of sufficient force for clutch action solved by an efficiently operating lever system; and the problem of clutch cooling, are broadly speaking, at the base of the novel features and improvements which I disclose in the present case.

I shall now briefly enumerate some of the salient objects and features so that the detailed description and the appended claims may be readily understood and appreciated.

One of the objects of my invention relates to a clutch mechanism cooperating with a driving member and having levers which react against said driving member during their clutch operating movement.

Another object is concerned with a clutch mechanism cooperating with a driving member and having levers which react against said driving member during their clutch disengaging movement, and abutment means attached to said driving member for cooperating with said levers as reaction bases therefor during the clutch engaging movement thereof.

A further object has to do with a clutch mechanism having a pressure plate cooperating with a driven member for coupling said driven member with a driving member, levers on said pressure plate, reaction bases for said levers mounted in said driving member and registering with the surface thereof, and other reaction bases for said levers mounted on said driving member opposite said first reaction bases.

Still another object is realized in a clutch mechanism cooperating with a driving member, comprising a pressure plate, extensions thereon, notches in said driving member for receiving said extensions, levers mounted in said extensions and reacting against the bottom of said notches during the clutch disengaging action of the mechanism, and abutment straps mounted across said notches on said driving member and serving as reaction bases for said levers during the clutch engaging operation of said mechanism.

Another object relates to a clutch operating mechanism comprising a pressure plate, levers and spring means cooperating with said plate, said spring means being mounted on said levers and reacting against said plate.

A further object is concerned with a clutch operating mechanism comprising a pressure plate, levers, springs mounted on said plate and reacting against said levers, and means cooperating with said plate and with said levers for locking said mechanism in unitary assembly when dismounted from said driving member.

I have enumerated above the salient objects and features of this case. Other objects and features will appear as the description progresses.

Now, in order to acquaint others with the invention and its several features, I shall describe the same with reference to the accompanying drawings in which:

Figure 1 shows a cross sectional side view of a clutch mechanism operating with a fly-wheel of the pot-type;

Figure 2 is an end elevation of the embodiment shown in Figure 1;

Figure 3 is a partial edge view of the mechanism, illustrating particularly an abutment cooperating with the fly-wheel and with an operating lever;

Figure 4 is a cross sectional side view of another embodiment of the invention, similar to the embodiment shown in Figures 1 to 3, inclusive, with the exception that I have provided notches or slots in the flange of the pot-type fly-wheel, each for receiving an extension of the pressure plate and the lever cooperating therewith. The abutment in this embodiment is a simple strap mounted across each slot of the fly-wheel;

Figure 5 is a fragmentary elevation of the embodiment shown in Figure 4;

Figures 6 and 7 are two views of a spring type in cooperation with a lever and a pressure plate in which the spring is mounted in the pressure plate and reacts against the lever; and Figures 8, 9, and 10 represent three views of another type of spring cooperating with a pressure plate and a lever, wherein the spring is mounted on the lever and reacts against the pressure plate.

Referring now more particularly to the embodiment shown in Figures 1, 2, and 3, the numeral 1 designates a fly-wheel which may be mounted on an engine crank shaft. This fly-wheel is of the so-called pot-type; that is to say, it has not a plane surface, but is provided with a flange, as indicated in Figure 1 by the reference numeral 2. Rotatably journaled in this fly-wheel and extending coaxially therewith is a driven shaft 4, being journaled in a bearing which is diagrammatically indicated at 3. This driven shaft, which may extend to the transmission system, is also rotatably journaled at 5 in the wall of the bell housing 6. A portion of the driven shaft 4 is splined as indicated by the reference numeral 7. Mounted on this splined portion 7 and movable endwise thereon, is the hub 8. This hub is provided with a flange 9, and attached to this flange by means of rivets such as 10 and 11 is the driven plate or disc 12. This driven plate may be of the flexible type and attached to its outer portion may be the friction members indicated in the drawings by the reference numerals 13 and 14. Thus, the driven plate 12 carrying these friction members 13 and 14 is in loose engagement with the driven shaft 4. Direct driving relation between the driving member (fly-wheel 1) and the driven member (shaft 4) will be accomplished when the friction member 13 establishes and maintains engagement with the friction surface on the fly-wheel.

The mechanism for bringing about the engagement of the friction member 13 of the driven plate 12 with the friction surface of the fly-wheel, comprises the pressure plate 15, operating levers mounted on this pressure plate and projecting substantially radially toward the center thereof, such as the levers 16, 17, and 18, an operating spring 19 reacting against the pressure plate and against the levers as is shown particularly in Figure 1, and certain abutments which cooperate with the levers and provide reaction bases therefor when the levers are actuated to bring about the engagement or the disengagement of the clutch.

The above intimated clutch operating mechanism is a unitary assembly and the parts which cooperate with each other are disposed and operate as follows:—

The pressure plate 15 is provided with a number of integral extensions which project laterally from the outer portion thereof. Each of these extensions is provided with a milled slot, forming forked supports which extend from the pressure plate. The branches of these forked supports resulting from the slotting of the extensions on the pressure plate are designated in the drawings by the reference numerals 20—21, 22—23 and 24—25. Pivotally mounted in each of these support extensions is a lever. Thus, the lever 16 is pivotally mounted in the support having the branches 20—21; the lever 17 is mounted between the branches 22—23; and the lever 18 is pivotally mounted between the branches 24—25. The mounting of each lever is by means of a pin such as indicated in Figures 1 and 3 by the reference numeral 26. The reaction portion of each lever is thus brought into register with the surface of the flange of the fly-wheel. This condition is particularly seen in Figure 1, in which it is shown that the reaction section 27 of the lever 16 is in register with the surface 28 of the flange 2 of the fly-wheel. Inserts or pegs, such as 29, 30, and 31, may be provided in the flange of the fly-wheel where the levers contact the same. It is not absolutely necessary to use these inserts. However, when the same are employed as reaction bases, it will be advisable to use hardened material for the same. The inserts (if such are used) represent the reaction bases for the corresponding operating levers in the clutch disengaging operation thereof. The use of hardened inserts, such as 29, 30, and 31, will bring advantages such as the possibility of exchanging the reaction bases in case the same should be worn down. The wearing surfaces of the various levers, it will be remembered, may also be hardened in order to increase their durability.

Mounted on the flange of the fly-wheel over the corresponding extensions of the pressure plate and the levers mounted therein, are U-shaped straps such as indicated by the reference numerals 32, 33 and 34. Each of these straps is attached to the fly-wheel by means of suitable bolts such as indicated by the numerals 35—36, 37—38 and 39—40, respectively. These U-shaped straps serve as abutments and provide reaction bases for the corresponding levers in the clutch engaging action thereof.

For example, examining the Figure 1, the spring 19 being disposed between the pressure plate and the levers, such as 16, has a tendency to expand and to move the levers outwardly, away from the clutch. Each of these levers reacts against the corresponding abutment strap, such as 32, and the pressure plate 15 will therefore be depressed against the friction member 14 on the driven plate 12. Accordingly, the friction member 13 will engage the friction surface on the fly-wheel and the driving relation between the driving member and the driven shaft will be established and will be maintained as long as no change occurs.

I have shown in Figure 1 a mechanism cooperating with the driven shaft 4, which comprises the thrust bearing 41, and the bracket lever mechanism diagrammatically indicated at 42. The thrust bearing may be mounted on a sleeve carried by the driven shaft. The connection indicated by the numeral 43 is attached for the purpose of lubricating the thrust bearing and related parts. Now, when it is desired to disengage the clutch, the bracket lever mechanism 42 will be actuated, the thrust bearing 41 will thereby be moved toward the inner ends of the levers such as 16, 17, and 18, and will depress these levers against the force of the spring 19. The levers will find reaction bases, for their corresponding reaction portions, such as 27, either directly on the surface of the flange of the fly-wheel (if no abutment inserts such as 29 are used) or on the corresponding insert such as 29 attached to the fly-wheel. In either case, the levers reacting against the surface of the fly-wheel will move the pressure plate 15 out of engagement with the friction surface 14, and thereby will release the driven disc 12 from engagement with the friction surface of the fly-wheel. The direct driving connection from the fly-wheel to the driven shaft will thus be discontinued. The clutch will be disengaged.

I shall now call attention to various details of the above described assembly.

It will be seen that I have provided, in the inner portion of the pressure plate 15, radial projections such as indicated by the numerals 44 and 45 in Figure 1. Several such projections are provided on the pressure plate and extend radially from the inner portion thereof. The spring 19 is mounted on these projections. These projections, therefore, represent an intermittent support for the spring 19, and the area of contact between the pressure plate and the spring is thereby reduced. This, of course, reduces the possibility for the transfer of heat from the pressure plate to the spring, and is a provision made in accordance with an object of the invention as recited previously. The other end of the spring 19 reacts directly against the hook-shaped inner ends of the levers, such as 16, and directly contacts with the levers. There are no operating parts disposed between the pressure plate 15 and the levers except the operating spring 19.

This operating spring could obviously be of a different shape than I have shown in the drawings, and, if desired, more than one spring may be employed. For example, it is possible to employ coiled single or compound springs in cooperation with the various levers and the pressure plate. Such modifications are within the limits of my invention. Other spring types which may be used will be described later on.

At 46 I have indicated a pin cooperating with the lever 16 and with the corresponding extensions such as 20 and 21 on the pressure plate 15. There is one such pin provided for each lever, as shown in Figure 2. The purpose of these pins is to hold the clutch operating mechanism in unitary assembly when dismounted from the flywheel. The pins will be inserted before removing the abutments 32, 33 and 34, to lock the levers in place.

With the above description of the embodiment shown in Figures 1 to 3, inclusive, in mind, the following description of the embodiment shown in Figures 4 and 5 will be easily understood. In order to avoid repetition, I shall refer mainly to those features of the embodiment shown in Figures 4 and 5 which represent structural or functional differences over the above described mechanism.

Referring now to Figures 4 and 5, these figures show a clutch operating mechanism in conjunction with a pot-type fly-wheel, as in the previously described case, but disclose various other improvements. In this particular embodiment I have provided notches or slots such as 50 and 51 in the flange 49 of the fly-wheel. Disposed in these slots are the milled extensions of the pressure plate, having the branches 53—54 and 55—56. Mounted pivotally in each of these extensions are levers such as 58, 59, and 60. Figure 5 is but a fragmentary view and shows part of lever 60 while omitting its mounting. Each lever is attached pivotally to the corresponding milled extension on the pressure plate by means of a pin such as 61 and 62, shown in connection with levers 58 and 59. Disposed on projections such as 63 in the inner portion of the pressure plate 57, and the inner hook-shaped ends of the levers is the operating spring 64.

During the disengaging operation, each lever will find a reaction base at the bottom of the corresponding notch or slot in the flange of the fly-wheel. Simple abutment straps such as 65 and 66 are attached across the various slots in the flange of the fly-wheel as shown, and provide reaction bases for the corresponding levers during the clutch engaging action thereof. The attachment of the straps to the flange of the fly-wheel is by means of bolts, as shown in the drawings.

If desired, hardened inserts such as 67 may be employed in conjunction with the fly-wheel to provide the reaction bases for the levers.

The operation is similar to the operation of the previously described mechanism.

When disengagement of the clutch is desired, the bracket lever mechanism diagrammatically indicated at 68 will be actuated to move the thrust bearing 69 and the latter will engage the inner ends of the levers 58, 59, and 60 and will move these levers against the force of the spring 64. The levers will find reaction bases at the bottom of the various slots in the flange of the fly-wheel, and will lift the pressure plate 57 out of engagement with the corresponding friction member of the driven plate. The driven plate will disengage the friction surface on the flywheel, and direct driving relation of the driven shaft relative to the driving member will be discontinued.

The mechanism as shown in Figure 4 is in the clutch engaging position. The spring 64 reacts against the ends of the levers, tending to move these levers outwardly away from the clutch. The levers find reaction bases in the straps such as 65 mounted across the corresponding slots in the flange 49 of the fly-wheel and the pressure plate 57 is therefore depressed against the corresponding friction member on the driven plate 70.

The mounting of the spring 64 in the above described embodiment corresponds to the mounting of the spring in the embodiment shown in Figures 1, 2, and 3. The inserts, such as 67, at the bottom of the various slots in the flange of the fly-wheel may or may not be used as desired. If these inserts are used, it will be advisable to make them of hardened material so as to have the benefit of exchangeable wearing surfaces for the levers.

The abutment straps connected across the slots in the flange of the fly-wheel may also be suitably hardened in order to increase the durability of the reaction surfaces. The wearing surfaces of the levers may also be treated to provide for the desired durability.

In the previously described embodiment I have shown a pin which may be inserted into holes in the extensions on the pressure plate and through the lever mounted in the extensions, for maintaining the assembly of the clutch operating mechanism as a unit when the same is dismounted from the fly-wheel. In the embodiment shown in Figures 4 and 5, I have provided a similar pin 71 which extends through the extensions on the pressure plate and is relatively firmly located therein. The lever is provided with an elongated opening 72 through which the pin 71 extends. The elongated opening 72 will permit movement of the lever with the pin inserted through the extensions on the pressure plate. Therefore, the action of the lever in the clutch engaging as well as in the clutch disengaging movement will not be interfered with by the pin 71, and, at the same time, the pin 71 cooperating with the corresponding extensions on the pressure plate and the lever mounted in these extensions will serve the purpose of maintaining the mechanism in unitary assembly when the same is removed from the flywheel.

I have said previously that individual springs may be used in cooperation with the levers instead of a common spring cooperating with the levers as shown in the embodiments so far described. In the Figures 6 to 10 inclusive, I have shown certain embodiments of this nature which I will now describe in detail.

Accordingly, in Figures 6 and 7, I have shown a fragmentary view of a mechanism: that is to say, I have shown only a portion of one lever designated by the numeral 75. This lever may be mounted in extensions on a pressure plate 76, in a manner as I have described in connection with previously discussed embodiments of the invention. A rat trap type spring such as 77 may be supported by the pressure plate 76 by inserting the ends 78 and 79 thereof into suitable openings in the pressure plate as shown. The central portion 80 of the spring reacts against the hook-shaped inner end of the lever. Each lever is thus individually actuated.

In Figures 8, 9, and 10 I have shown another type of spring, in this case a spring 81 which is mounted on the lever 82 by means of a cross pin 83, and which reacts with its ends 84 and 85 against the pressure plate 86.

I now desire to call attention to certain peculiarities of the disclosed structures, and to modifications which may be carried out within the scope and the teaching of the invention.

It will be recalled that I have spoken of the fact that my clutches limit the production of heat and also provide for efficient radiation of heat away from the operating parts. The heat produced in a clutch is, of course, a function of the heat absorbed by the various parts due to slippage. My clutch structures, due to improvements in the structure of detail parts as well as in the entire assembly, show a high degree of mechanical efficiency which reduces the possibility of slipping to a minimum. Accordingly, the heat production, or rather the possibility for heat production is also reduced. Transfer of heat from one part to the other is inhibited as discussed in detail, and heat radiation is promoted due to the open structure of the mechanism which does not permit the accumulation of heat in pockets and the like.

I have also mentioned that the levers are so constructed as to multiply the force of the spring action. It will be observed that the levers are unusually long as compared with the length of levers of this kind in the ordinary clutch structure. This length of the levers cuts down the angle of travel required of the lever for any given or required linear movement of the clutch parts. The clutch is therefore adapted to be actuated with more ease and certainty than is the case with prior structures of this character.

At several places of the description, I have said that there are no operating means disposed between the spring means and the levers, and that the spring means contacts directly with the levers. This structure is also shown in the drawings. However, I desire to emphasize that I am aware of certain modifications which may easily be carried out in this respect, and that I wish to include these modifications in the broad terms which I have employed to describe the structures.

The abutment inserts which I have shown and described to register with the surface of the fly-wheel or with the bottom of the notch therein, respectively, could manifestly be formed so as to project from the fly-wheel to form a peg or stud against which the corresponding lever can react. Such change is understood to fall within the meaning of the broad claims directed to cover this particular feature.

Further modifications, in addition to the ones specifically recited above, are included at various places throughout the description. I have not made an attempt to exhaust the subject of giving different expressions to the invention. It will be understood that other and further changes may be devised, in regard to details as well as in regard to the assembly as a whole, and I therefore state that I have shown and described specific embodiments, and that I have specifically stated certain modifications thereof, for the purpose of showing ways of putting the invention into practical use, but not to show the limits and the scope of the same. As remarked previously, I intend to use the invention in all such embodiments which may fall within the scope of the following claims, in which I have defined what I believe is new and distinguishing over the prior art.

I claim as my invention:—

1. A clutch mechanism for effecting driving engagement of a driven member relative to a driving member, comprising a pressure plate, levers thereon, abutment means therefor, said levers reacting directly against said driving member during the clutch disengaging action and directly against said abutment means during the clutch engaging action thereof.

2. A clutch cooperating with a driving member and a driven member, comprising operating means for coupling and for uncoupling said members, lever means cooperating with said operating means, said driving member serving directly as a reaction base for said lever means in one direction of movement thereof, and abutment means attached to said driving member and cooperating with said lever means as a reaction base therefor in another direction of movement thereof.

3. In a clutch operating mechanism cooperating with a driving member and including a plurality of operating levers, hardened inserts acting as reaction bases in said driving member and registering substantially with the surface thereof for cooperating with said levers, and abutment means mounted on said driving member and also cooperating with said levers as reaction bases therefor.

4. In a clutch, a driving member having recesses, means serving as reaction bases in said recesses, reaction bases on said driving member projecting therefrom, and lever means cooperating with said reaction bases and said first named means for actuating said clutch.

5. A clutch mechanism for coupling a driving member with a driven member, comprising a pressure plate, lever means pivotally connected with said pressure plate, spring means mounted on said pressure plate and reacting against said lever means, means for holding said mechanism in unitary assembly, abutment means for said lever means attached to said driving member and projecting therefrom, and abutment means for said lever means inserted in said driving member and registering with the surface thereof.

6. A clutch mechanism for coupling a driving member with a driven member, comprising a pressure plate, lateral extensions thereon, notches in said driving member for receiving said extensions, lever means pivotally connected with said extensions, and abutment means for said lever means attached to said driving member across said notches.

7. In a clutch mechanism cooperating with a fly-wheel having a peripheral axially extending flange, a pressure plate for effecting engagement and disengagement of a driven member relative to said fly-wheel, said driven member being disposed between said fly-wheel and said pressure plate, ears on said pressure plate extending angularly over the flange of said fly-wheel, levers pivotally connected with said ears, said levers extending substantially toward the center of said clutch, projections on said pressure plate, spring means disposed on said projections and reacting against said levers, abutment means inserted in the flange of said fly-wheel, one for each lever, for providing a reaction base for each lever when the same is operated to disengage the clutch, and abutment bracket means mounted on said flange of said fly-wheel to provide a reaction base for each lever when the same is operated to effect engagement of the clutch.

8. In a clutch mechanism cooperating with a flywheel having a peripheral axially extending flange, a pressure plate for effecting engagement and disengagement of a driven member relative to said fly-wheel, said driven member being disposed in said fly-wheel between said pressure plate and a friction surface of said fly-wheel, ears on said pressure plate extending angularly over the flange of said fly-wheel, levers mounted in said ears, said levers extending substantially toward the center of said clutch, centrally extending projections on said pressure plate, spring means disposed on said projections and reacting against said levers, inserts in the flange of said fly-wheel, one for each lever, for providing reaction bases for said levers when the same are operated to disengage the clutch, abutment bracket means mounted on the flange of said fly-wheel for providing reaction bases for said levers when the same are operated to engage the clutch, and means for locking each lever against movement to secure the unitary assembly of said mechanism when dismounted from said fly-wheel.

9. In combination with a pot-shaped driving member, a clutch mechanism, comprising a pressure plate, extensions thereon, levers carried by said extensions, a spring carried by said pressure plate centrally thereof, said spring reacting against said levers, a reaction base on said driving member for each lever, said reaction bases being flush with the surface of said driving member, abutment brackets for each lever attached to said driving member, and means for locking each lever to secure the assembly of said clutch mechanism when not attached to said driving member.

10. In combination with a driving member, a clutch mechanism, comprising a pressure plate, lateral extensions thereon, levers carried by said extensions, spring means carried by said pressure plate, the reaction of said spring means being effective on said levers, and means for locking said levers against movement to secure said mechanism in assembly when not mounted on a driving member.

11. In combination with a driving member, a clutch mechanism, comprising a pressure plate, extensions thereon, levers carried by said extensions, spring means carried by said pressure plate, the force of said spring means reacting against said levers, inserts in said driving member, one for each lever, for serving as reaction bases for said levers in one direction of movement thereof, abutment brackets, one for each lever, for attaching said mechanism to said driving member and for providing a reaction base for each lever in another direction of movement thereof, and means for locking said levers against movement to secure said mechanism in unitary assembly when dismounted from said driving member.

12. A clutch mechanism cooperating with a flanged fly-wheel, comprising a pressure plate, radial extensions thereon, notches in the flange of said fly-wheel for receiving said extensions, levers carried by said extensions, spring means on said pressure plate cooperating with said levers, and abutment straps for said levers bridging said notches in said fly-wheel and attached thereto.

13. A clutch mechanism cooperating with a flanged fly-wheel, comprising a pressure plate, radial extensions thereon, notches in the flange of said fly-wheel for receiving said extensions, levers carried by said extensions, spring means on said pressure plate cooperating with said levers, and abutment straps bridging said notches in said fly-wheel and attached thereto for holding the mechanism in assembly on said fly-wheel, the bottom of each of said notches serving as a reaction base for the corresponding lever in one direction of movement thereof, and said abutment straps providing reaction bases for said levers in the other direction of movement thereof.

14. A clutch mechanism cooperating with a flanged fly-wheel, comprising a pressure plate, radial extensions thereon, notches in the flange of said fly-wheel for receiving said extensions, levers carried by said extensions, spring means on said pressure plate cooperating with said levers, abutment straps bridging said notches in said fly-wheel and attached thereto for holding the mechanism in assembly on said fly-wheel, the bottom of said notches serving as reaction bases for said levers in one direction of movement thereof, and said abutment straps providing reaction bases for said levers in the other direction of movement thereof, and means for locking said levers against movement in either direction to secure the unitary assembly of said mechanism when not mounted on said fly-wheel.

15. In a clutch cooperating with a driving member, a pressure plate, extensions thereon, levers mounted in said extensions and projecting radially substantially toward the center of said clutch, spring means disposed between said pressure plate and said levers, abutment means inserted in said driving member for cooperating with said levers as reaction bases therefor, and other abutments mounted on said driving member and cooperating with said levers.

16. In a clutch, an operating member, levers mounted thereon and extending radially thereto, and a spring for each lever, each spring being mounted on said lever with the ends of said spring anchored to and reacting against said operating member, each spring being wholly supported by said operating member and the corresponding lever.

17. A clutch mechanism for effecting driving engagement of a driven member relative to a driving member, comprising a pressure plate, levers thereon, abutment means therefor, said levers reacting directly against said driving member during the clutch disengaging action and directly against said abutment means during the clutch engaging action thereof, and spring means carried by said pressure plate and bearing against said levers.

GEORGE I. GOODWIN.